United States Patent [19]

Boyd et al.

[11] Patent Number: 5,724,919
[45] Date of Patent: Mar. 10, 1998

[54] DEVICE FOR ACHIEVING ANIMAL RESPONSE

[75] Inventors: Randal D. Boyd, Knox; Walter J. Frankewich, Blount, both of Tenn.

[73] Assignee: Radio Systems Corporation, Knoxville, Tenn.

[21] Appl. No.: 707,703

[22] Filed: Sep. 4, 1996

[51] Int. Cl.⁶ .................................................. A01K 15/00
[52] U.S. Cl. ............................ 119/719; 119/908; 340/573
[58] Field of Search ................................ 119/719, 718, 119/720, 721, 908, 859; 340/573

[56] References Cited

U.S. PATENT DOCUMENTS

| | | | |
|---|---|---|---|
| 4,335,682 | 6/1982 | Gonda et al. | 119/718 |
| 4,535,724 | 8/1985 | Davud | 119/712 |
| 5,061,918 | 10/1991 | Hunter | 340/573 |
| 5,170,149 | 12/1992 | Yarnall, Sr. et al. | 119/721 X |
| 5,214,411 | 5/1993 | Herbruck | 340/573 |
| 5,351,653 | 10/1994 | Marischen et al. | 119/719 |
| 5,425,330 | 6/1995 | Touchton et al. | 119/721 |

*Primary Examiner*—Gene Mancene
*Assistant Examiner*—Yvonne R. Abbott
*Attorney, Agent, or Firm*—Pitts & Brittian, P.C.

[57] ABSTRACT

A device for achieving animal response that produces two output frequencies, one to soothe the animal and one to distress the animal. The frequency for distressing the animal is an oscillating frequency to cause further attention by the animal and to provide optimum operation of the sound-producing element. The oscillating frequency is created by producing a second frequency higher than the first frequency, and then oscillating this second frequency. Sound is produced by a piezoelectric element driven by these frequencies. Components are generally contained in an enclosure body, with push buttons for selecting a desired sound output penetrating this enclosure body for contact by a user of the device.

16 Claims, 2 Drawing Sheets

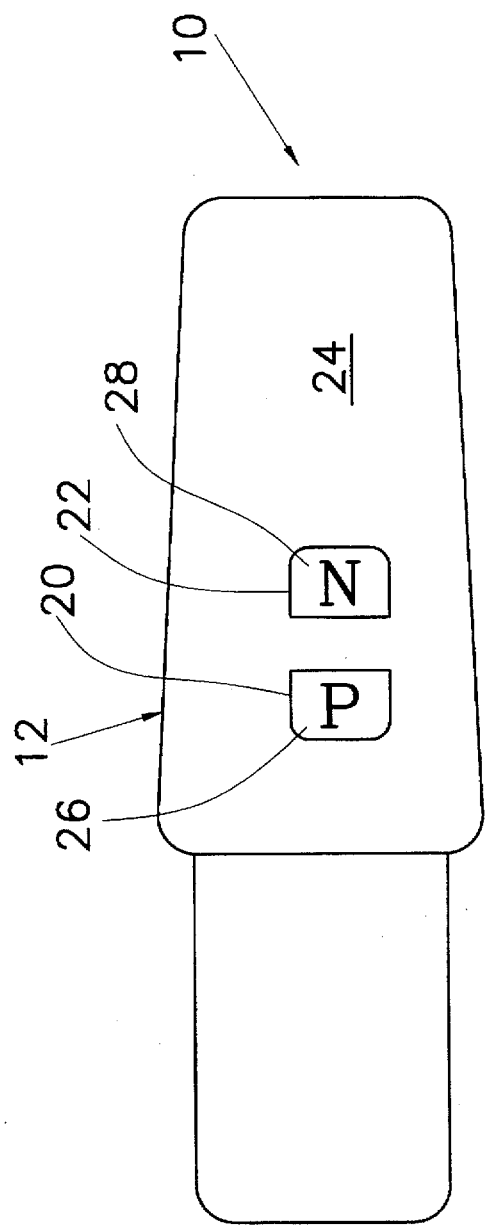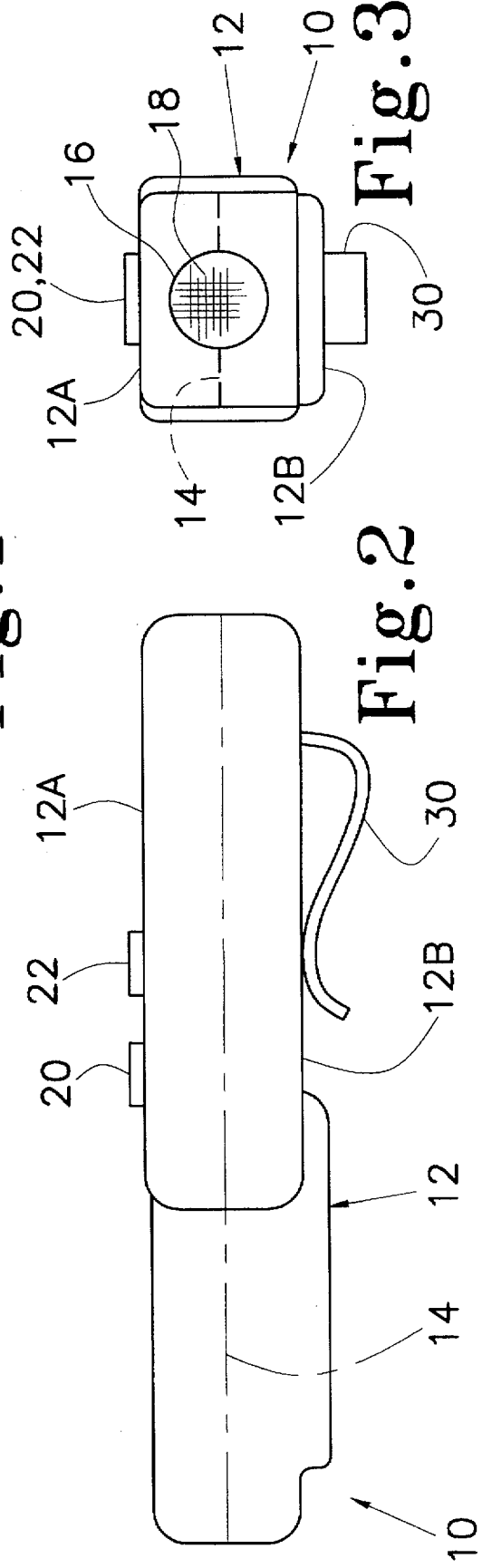

DEVICE FOR ACHIEVING ANIMAL RESPONSE

TECHNICAL FIELD

The present invention relates generally to sound-producing devices, and more particularly to a device for emitting two audible signals to either calm an animal with one signal or to dispel an animal with the other of the signals.

BACKGROUND ART

Many animals, both domestic and wild, often cause problems due to their actions. These include eating vegetation, soiling the property and like actions. Because of these problems, it is desired to dispel the animal from the premises. In addition, there are situations where it is desired to calm the animal.

It has been shown that animals respond to sounds of certain frequencies. This is utilized in the device shown and described in U. S. Pat. No. 5,351,653 issued to J. Marischen on Oct. 4, 1994. In that particular patent, two separate continuous frequencies can be produced: one for reassuring the animal; and the other for disturbing the animal. It is used to train the animal (dog) by giving approval to the dog when commands are obeyed, and disturbing the dog when the commands are not followed. Typical frequencies for these actions are 480 Hz (at 80 db) for giving approval, and 16.7 KHz (at 110–115 db) for giving disapproval. However, since the frequencies utilized are constant, the animal's attention is sometimes not attained.

Other references dealing generally with the repelling of animals are U.S. Pat. No. 5,214,411 issued May 25, 1993 to S. Herbruck; and U.S. Pat. No. 5,061,918 issued Oct. 29, 1991 to J. Hunter. Both of these reference deal with the creation of a singular audible signal to influence the animal, specifically to discourage an undesirable action of the animal.

Accordingly, it is an object of the present invention to provide a device that can be utilized either to encourage an animal or to dispel an animal.

A further object of the present invention is to provide a device that will emit two audible sounds, one to encourage the animal and the second to dispel an animal.

Another object of the present invention is to provide a device that will emit an audible signal of varying high frequency to dispel an animal, the variation of the frequency assisting in gaining the attention of the animal and achieving optimal operation of a piezoelectric sound-producing element.

These and other objects of the present invention will become apparent upon a consideration of the drawings referred to below, and to a complete description thereof.

SUMMARY OF THE INVENTION

In accordance with the present invention, there is provided a system that produces two distinct audible sounds of frequencies that can affect the behavior of animals. One of the frequencies is sufficiently low that an animal is not disturbed and even calmed. The second is of sufficiently high frequency that will cause the animal to be dispelled due to discomfort of the ears. In order to assure affecting the animal, the higher frequency is varied to draw attention to the signal. Operation of the system is controlled by switches: either in a hand-held unit, or by a selected remote switching operation.

BRIEF DESCRIPTION OF THE DRAWINGS

FIG. 1 is a plan view of a hand-held unit embodying one embodiment the present invention.

FIG. 2 is a side view of the unit of FIG. 1.

FIG. 3 is an end view of the unit of FIG. 1.

BEST MODE FOR CARRYING OUT THE INVENTION

Figure 4A:
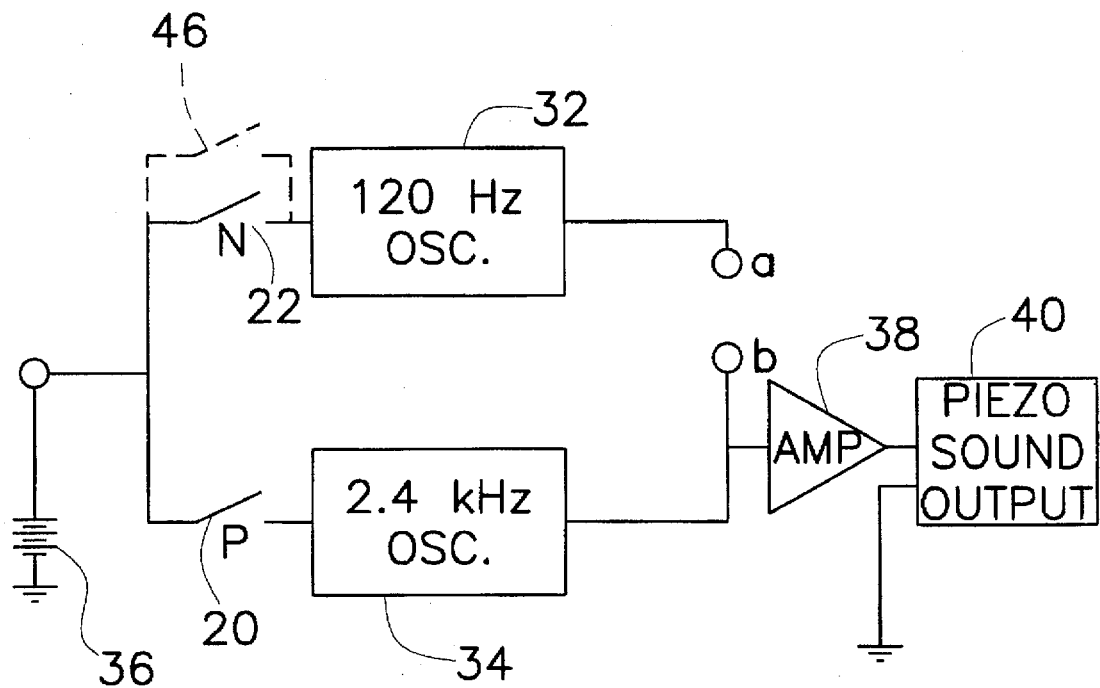
FIG. 4A is an overall schematic drawing of the device of the present invention.

Exterior views of a unit to accomplish the above-stated objects are given in FIGS. 1, 2 and 3 as indicated at 10. The entire unit is encased with a body 12, this body 12 typically formed from two portions 12A and 12B, joined as at a parting line 14. This body 12 is configured to be easily grasped by a user as well as enclose a battery and circuitry for operation. As indicated in FIG. 3, an end of the body 12 is provided with an aperture 16 to permit directing sounds produced by a sound generator within the body 12. Typically, a screen 18 covers the aperture 16 for physical protection of components within the body 12

A pair of push-buttons 20, 22 project through the top surface 24 of the body portion 12A. These push-buttons 20, 22 carry identification indices, as at 26, 28, to aid the user. The purpose of these buttons will be explained in conjunction with the circuit of FIGS. 4A and 4B. In addition, the body 12 typically is provided with a clip 30 formed with the body portion 12B. This clip 30 permits attachment to garments of a user.

Figure 4B:
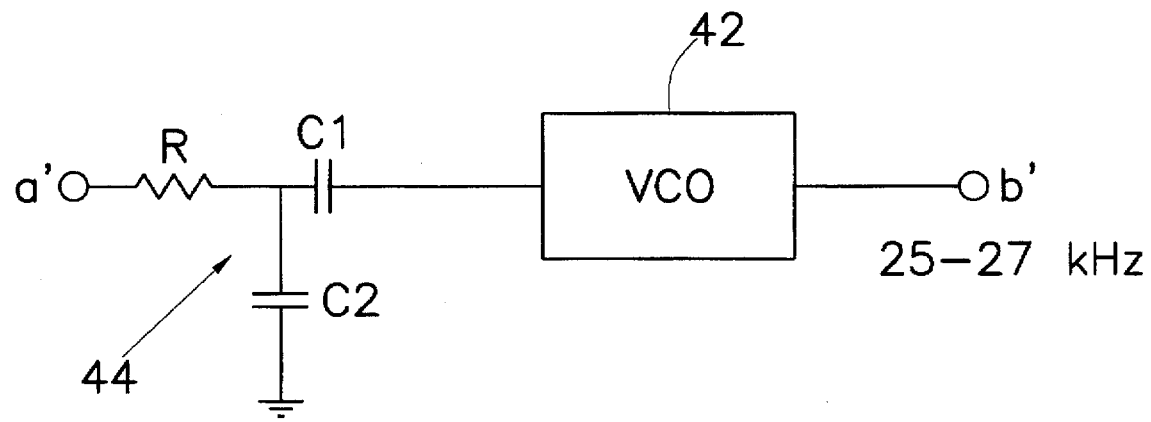
FIG. 4B is a schematic drawing of a circuit to vary the output frequency of the device of the present invention.

The circuit for the present invention is illustrated in FIGS. 4A and 4B. A voltage (typically 9 Vdc) is applied to one of two oscillators 32, 34 from a battery 36 using one of the afore-mentioned push buttons 20, 22. In this particular embodiment, oscillator 32 produces an output frequency of about 120 Hz which is a sweep rate frequency. The oscillator 34 produces an output frequency of about 2.4 KHz which can be heard by the animal without distress. The output of oscillator 34, and ultimately that of oscillator 32, after amplification in amplifier 38, cause a piezoelectric element 40 to emit sounds according to the two frequencies. The present invention provides for sweeping the frequency so as to achieve a non-constant frequency driving the piezoelectric element 40. This is achieved through the use of the sub-circuit of FIG. 4B when connected into the circuit of FIG. 4A at points a, a'and b, b'. This subcircuit utilizes a voltage-controlled oscillator 42 having a center frequency of about 26 KHz. The frequency range is controlled by an RC circuit as at 44 and the frequency sweep rate as controlled by the 120 Hz from oscillator 32. For the present invention, this oscillation occurs at 25–27KHz. Thus, the higher frequency being applied to the piezoelectric element 40 is varied over a wide range. This serves two functions. The main function is to achieve optimum operation of the piezoelectric element 40. Further, the oscillating sound frequency is found to be more distressing to an animal.

As indicated by FIGS. 1–3, the present device is primarily intended to be hand held, with the appropriate push-button depressed by the user. However, the present invention can be utilized in situations not controlled by a user. For example, the portion producing the higher frequency can be triggered by an "intrusion switch" as indicated at 46 of FIG. 4A. This intrusion switch 46, which might be a pressure switch, an infrared beam, etc., would be located where intrusion by the animal is not desired. This might be in a garden, for example. In this embodiment the switches 20, 22 could still be operated by a person.

From the foregoing, it will be understood that an improved device has been described for controlling the nature of an animal. While generally described as being contained within a hand-held body, this is not an entire limitation of the present invention. Further, while specific frequencies and components are given for illustration, this is not for limiting the scope of the invention. Rather, the scope is to be limited only by the appended claims and their equivalents.

I claim:

1. A device for achieving animal response, said device comprising:

a first oscillator circuit for producing a first output frequency in a range for soothing the animal;

a second oscillator circuit for producing a second frequency in a range of disturbing the animal;

a first switch for initiating operation of said first oscillating circuit;

a second switch for initiating operation of said second oscillating circuit;

a further oscillator circuit for receiving said second frequency and for varying said second frequency through a wide range to produce an oscillating frequency;

a sound-producing element for receiving one of said first frequency and said oscillating frequency to produce an audible sound according to one of said frequencies; and a power source.

2. The device of claim 1 further comprising an amplifier connected to receive said first frequency and said oscillating frequency for producing a driving voltage for said sound-producing element.

3. The device of claim 2 further comprising a enclosure body for said oscillators, said amplifier and said sound-producing element.

4. The device of claim 3 wherein said first and second switch are push button switches protruding through said enclosure body to permit operation by a user of the device.

5. The device of claim 3 wherein said enclosure body is provided with an aperture to disseminate sound produced by said sound-producing element.

6. The device of claim 1 wherein said first frequency is about 2.4 KHz, and said second frequency is about 120 Hz.

7. The device of claim 1 wherein said further oscillator is a voltage controlled oscillator operating at about 25 to 27 KHz.

8. The device of claim 1 wherein said power source is a DC battery.

9. The device of claim 1 wherein said sound-producing device is a piezoelectric element providing sound of a frequency corresponding to a driving frequency.

10. The device of claim 1 wherein said second switch is an intrusion switch located in an environment of intrusion by the animal for operation by the animal.

11. A device for achieving animal response, said device comprising:

a first oscillator circuit for producing a first output frequency in a range for soothing the animal;

a second oscillator circuit for producing a second frequency in a range of disturbing the animal;

a first switch for initiating operation of said first oscillating circuit;

a second switch for initiating operation of said second oscillating circuit;

a further oscillator circuit for receiving said second frequency and for varying said second frequency through a wide range to produce an oscillating frequency;

an amplifier connected to receive said first frequency and said oscillating frequency for producing an output driving voltage;

a sound-producing element for receiving said output driving voltage from said amplifier to produce an audible sound according to one of said first and oscillating frequencies; and a battery power source.

12. The device of claim 11 further comprising a enclosure body for said oscillators, said amplifier and said sound-producing element.

13. The device of claim 12 wherein said first and second switch are push button switches protruding through said enclosure body to permit operation by a user of the device, and said enclosure body is provided with an aperture to disseminate sound produced by said sound-producing element.

14. The device of claim 11 wherein said first frequency is about 2.4 KHz, said second frequency is about 120 Hz, and said further oscillator is a voltage controlled oscillator operating at about 25 to 27 KHz.

15. A device for achieving animal response, said device comprising:

a first oscillator circuit for producing a first output frequency of about 2.4 KHz for soothing the animal;

a second oscillator circuit for producing a second frequency of about 120 Hz, a first push button switch for initiating operation of said first oscillating circuit;

a second push button switch for initiating operation of said second oscillating circuit;

a further oscillator circuit for receiving said second frequency and for producing an oscillating frequency of about 25–27 KHz for disturbing the animal;

an amplifier connected to receive said first frequency and said oscillating frequency for producing an output driving voltage;

a piezoelectric sound-producing element for receiving said output driving voltage from said amplifier to produce an audible sound according to one of said first frequency and said oscillating frequency; and a battery power source.

16. The device of claim 15 further comprising a enclosure body for said oscillators, said amplifier and said sound-producing element, said enclosure body provided with an aperture to disseminate sound produced by said sound-producing element, and wherein said push button switches protrude through said enclosure body.

\* \* \* \* \*